United States Patent [19]
Veale et al.

[11] Patent Number: 5,319,990
[45] Date of Patent: Jun. 14, 1994

[54] COVER SYSTEM UTILIZING BAND

[75] Inventors: John R. Veale, Manhattan Beach; Steven E. Shapiro, Los Angeles, both of Calif.

[73] Assignee: California Technical Marketing Inc., Santa Monica, Calif.

[21] Appl. No.: 850,253

[22] Filed: Mar. 11, 1992

Related U.S. Application Data

[63] Continuation-in-part of Ser. No. 831,487, Feb. 5, 1992, abandoned.

[51] Int. Cl.⁵ .................. F16H 25/20; F24F 13/02; E05F 1/00
[52] U.S. Cl. .................. 74/89.15; 49/362; 49/412; 160/85; 454/64
[58] Field of Search .............. 74/89.15, 424.8 R; 49/362, 412; 160/85, 122; 251/901; 454/64, 187

[56] References Cited

U.S. PATENT DOCUMENTS

| | | | |
|---|---|---|---|
| 2,811,201 | 10/1957 | Reid, Jr. | 160/122 |
| 3,478,668 | 11/1969 | Scheel et al. | 454/64 |
| 3,788,208 | 1/1974 | Brumett | 454/64 X |
| 4,019,616 | 4/1977 | Thorne | 74/89.15 X |
| 4,086,847 | 5/1978 | Overmyer | 454/64 |
| 4,173,176 | 11/1979 | Svensson | 454/64 |
| 4,234,075 | 11/1980 | Tingskog | 160/122 X |
| 4,569,368 | 2/1986 | Haidlen et al. | 251/901 X |

FOREIGN PATENT DOCUMENTS

| | | | |
|---|---|---|---|
| 106244 | 4/1984 | European Pat. Off. | 74/89.15 |
| 462135 | 7/1928 | Fed. Rep. of Germany | 454/64 |
| 1-206153 | 8/1989 | Japan | 74/89.15 |

Primary Examiner—Allan D. Herrmann

[57] ABSTRACT

A linear drive system with an associated cover system wherein said linear drive system comprises a load, a lead screw, a lead nut operatively engaged to said lead screw such that said lead nut can travel along said lead screw by virtue of rotation of the lead nut, a load engaging structure means connecting the lead nut to the load such that as the lead nut travels along the lead screw, the load is moved, and motor means operatively engaged with the lead nut such that said motor means operates to rotate the lead nut, thereby moving the load.

A cover system an opening formed by two surfaces. Said cover system has a bridge structure, which can be a roller assembly, which is supported by structural means over and across the width of the opening. A band is positioned to cover the opening and is also mounted over the bridge structure. As the bridge structure is moved along the opening, the band is lifted from the opening, thereby allowing access to the opening by a device.

70 Claims, 17 Drawing Sheets

5,319,990

COVER SYSTEM UTILIZING BAND

This is a continuation-in-part of application Ser. No. 07/831487, filed Feb. 5, 1992, now abandoned.

BACKGROUND

1. Field of Invention

This invention relates to linear drive systems and covers for elongated openings.

2. Description of Prior Art

One purpose of this present invention is to provide a simple and effective means to create linear motion. Frequently, linear drive systems are utilized in machines such as, but not limited to, gantry robots, automated welding machines, automated milling machines, and automated painting machines. Often, lead screws with lead nuts are utilized to move loads in these machines. In such implementations, the load is structurally connected to the lead nut and the load is moved by rotating the lead screw.

These implementations have several disadvantages. First, lead screws often have substantial mass and width and much power is required to move the load because of the inertia of the lead screw. Second, such an implementation often suffers from lead screw whipping. Third, multiple loads utilizing the same lead screw, where linear motion is generated only by rotation of the lead screw, cannot move independently. The present invention avoids these problems by rotating the lead nut, rather than the lead screw.

The purpose of this present invention is to provide a low-cost cover for an opening, yet allow access to the opening by a device or structure which travels along said opening.

Machines which include devices which travel along openings, where the devices and/or openings should be covered to prevent exposure to dust, etc., often utilize bellows or telescoping covers. These types of covers have the distinct disadvantage of taking space at the ends of the openings when in a compact position. Therefore, the structural member or members creating the opening must be longer than otherwise required in order to provide room for the cover. These types of covers are also expensive to employ, and the present invention provides a low cost solution to the problem.

Applicants have located prior art in the form of United States patents which may interest the examiner, although applicants believe that none of the prior art located anticipates nor renders obvious the present invention. The present invention utilizes a substantially stationary band as a cover, which is lifted from an opening by a bridge structure to allow access to the opening. None of the United States patents located by applicants utilize such a stationary band. The United States patents located by applicants are as follows:

a. U.S. Pat. No. 4,403,534, to Altendorf et al., on a movable protective hood for power tool of a work tool machine;

b. U.S. Pat. No. 4,543,021, to Adler, on a safety shield for a milling machine, drill press, and the like;

c. U.S. Pat. No. 4,813,462, to Linn, on an apparatus for confining and removing dust and other debris from a work region of a machine;

d. U.S. Pat. No. 4,802,392, to Striebig, on a method of extracting the wood dust collecting in vertical panel saws;

e. U.S. Pat. No. 4,613,261, to Maier et al., on a router tool;

f. U.S. Pat. No. 4,051,880, to Hestily, on dustless routers;

g. U.S. Pat. No. 3,824,890, to Zettler et al., on a chip guard for machine tools;

h. U.S. Pat. No. 3,366,012, to Richter, on a machine tool guard structure; and i. U.S. Pat. No. 3,022,806, to Johnston, on a router dust guard.

OBJECTS AND ADVANTAGES

The present invention includes a linear drive system which moves a load by means of rotating a lead nut, as opposed to rotating a lead screw. Accordingly, the present invention has the following objects and advantages:

a. Less power is required to move the load because inertia of the lead screw is not a factor;

b. turning the nut to create motion reduces lead screw whipping; and c. multiple loads can utilize the same lead screw, yet move independently.

The present invention has the following objects and advantages:

a. It does not take space at the ends of the opening as does a bellows or telescoping cover;

b. the present invention can be constructed at lowcost as opposed to other covers;

c. the band element of the present invention can be lengthened or shortened to cover a longer or shorter opening without changing the design or characteristics of the other elements of the invention and without great expense; and d. the present invention can cover especially long openings or surfaces for which other types of covers are unsuitable and unwieldy.

DRAWING FIGURES

The features of a specific embodiment of the best mode contemplated of carrying out the invention are illustrated in the drawings, in which.

LIST OF REFERENCE NUMERALS

1. Lead Screw
2. Lead Nut
3. Drive Belt
4. Linear Slide
5. Linear Slide Block(s)
6. Motor and Nut Brace
7. Motor
8. Lifting Roller Assembly
9. Retaining Roller Assembly
10. Band
11. Hood Apparatus
12. Cylinder
13. Pin
14. Surface(s)
15. Covered Opening
16. Elongated Flexible Member(s)
17. Groove(s)
18. Ball Bearing(s)
19. Narrow Portion of Elongated Flexible Member
20. Load Mounting Bracket
21. Motor Mounting Screw(s)
22. Nut Pulley
23. Motor Pulley
24. Screw Hole(s) For Mounting Hood Apparatus
25. Hood Mounting Screw(s)
26. Frame Structure
27. Band Brush
28. Interconnecting Air Pipe
29. Supply Pipe
30. Ball Bearings
31. Spring
32. Nut End Structure
33. Set Screw
34. Support Pillar
35. Wiper Brushes
36. Pressure Plate
37. Vacuum Or Air Pressure Means
38. Nut Brace
39. Retaining Pin
40. Solenoid
41. Controller
42. Servo Controller
43. Servo Amplifier
44. Encoder
45. Ball Bearing
46. Pivot
47. Spring
48. First Band
49. Second Band
50. Take Up Reel
51. Steady Brace
52. Screw Clamp
53. Frame End Structure
54. Lead Screw End Nuts
55. Support Frame.

DESCRIPTION—FIGS. 1 to 13

Figure 1:
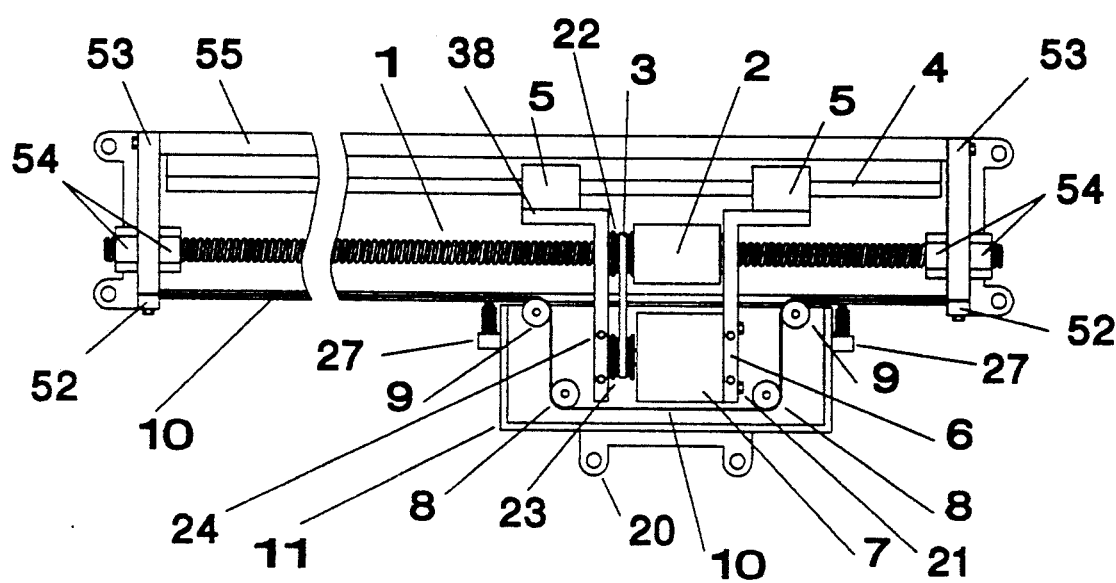
FIG. 1 is a top view in cross-section of the linear drive system implemented with associated cover system.

A typical embodiment of the present invention is illustrated in FIG. 1 (top view cross-section). In this particular embodiment the present invention is utilized as a dust cover system. Said dust cover system has a band (10), which is made of a flexible material which can be repeatedly bent and straightened out without fracturing, such as, but not limited to, spring steel, plastic, or rubber. The band is positioned so as to cover an elongated opening (not shown in FIG. 1). The band will generally be attached at both ends, although in a circular system the band might be nonending. Springs might be used at the ends to add tension to the band. In this particular embodiment, the band is retained by a screw claim (52) screwed into a frame end structure (53). Said frame end structure has a hole therethrough sufficiently large to accept the lead screw and the frame end structure is positioned around the lead screw, thereby supporting the lead screw. Two lead screw end nuts (54), one on each side of the frame end structure, hold the lead screw in place. The frame end structure and lead screw end nuts provide means for retaining and supporting the lead screw.

The system also has a hood apparatus (11). The hood apparatus may be constructed as single piece or of several pieces. Generally, it will be made of metal, such as aluminum, but it can be made of other materials. It can be constructed with many different shapes, although the simplest is a hollow box shape with an open side, as shown in FIG. 1. The hood apparatus shown in FIG. 1 is the general shape of a shoe box without a lid, having edges defining a hole therein. Applicants intend that the term "hood apparatus" include structure within the hood apparatus, other than the bridge structures described hereinafter and the means for attaching said bridge structures to said hood apparatus. A hood apparatus should be sufficiently wide to allow the width of the band to be lifted within the hood apparatus.

Disposed within and attached to the inside of the hood apparatus are bridge structures, which, in this particular embodiment, are roller assemblies (8) supported above and across the width of the opening. In this particular embodiment the roller assemblies are constructed of aluminum cylinders and pins within the cylinders. Roller assemblies can be constructed of other materials, such as, but not limited to, rubber and plastic. However, the less flexible the material, the less friction created by the rollers in the system, which is why metal cylinders are utilized in this embodiment. The roller assemblies are parallel to the width of the band and the band is mounted over the roller assemblies such that the two roller assemblies lift the band from the opening. Hereinafter, these roller assemblies are described as "lifting roller assembly" or "lifting roller assemblies". A "bridge structure" will generally be substantially parallel to the width of the band and will be at least as wide as the band. It need not be a bridge in the sense that it is supported at two ends, but is a bridge in the sense that it will overhang the opening to be covered. The hood apparatus should be sufficiently structural to support a bridge structure.

Two additional roller assemblies (9) are disposed within and attached to the inside of the hood apparatus. These two roller assemblies are closer to the opening than the lifting roller assemblies and are substantially parallel to the lifting roller assemblies. The second described roller assemblies are positioned so as to press the band toward the opening (hereinafter "retaining roller assembly" or "retaining roller assemblies"). Applicants intend that "roller assembly", as used in this specification and in the claims, include "roller" as well as other assemblies serving as rollers. Applicants recommend that ball bearings be utilized in the construction of roller assemblies to reduce friction.

The embodiment illustrated by FIG. 1 also has a lead screw (1), which runs along the opening and is parallel to the length of the band, and a lead nut (2) on said lead screw. Generally, the best lead screw to utilize in this embodiment is a ball screw, although less-precise and less-expensive lead screws can be utilized. There is also a linear slide (4) which runs parallel to the lead screw, and there are two linear slide blocks (5) on said linear slide. Said linear slide blocks and linear slides are well known in the art. It is intended that the term "linear slide" include linear motion guide and linear bearing system. The linear slide is attached to a support frame (55).

One linear slide block is attached to a motor and nut brace (6) and the other is attached to a nut brace (38). The braces in this embodiment should be structurally strong, and applicants have utilized thick aluminum in this embodiment. Attached to the motor and nut brace is a motor (7), which is mounted to said motor and nut brace by mounting screws (21). Each brace has screw holes (24) for mounting the hood apparatus.

A pulley (23) is operatively connected to the motor and a second pulley (22) is operatively connected to the lead nut. A drive belt (3) is disposed around the two pulleys. Hereinafter, the first described pulley is defined as a "nut pulley" and the second described pulley is defined as a "motor pulley."

A load mounting bracket (20) is attached to the hood apparatus such that a load can be attached to the cover system. In this particular embodiment, the load mounting bracket is screw mounted on the hood apparatus. Other load engaging means can be utilized to engage the load, such as, but not limited to, clamps and welding. Brushes (27) are also attached to the hood apparatus to brush the band as the hood apparatus moves. The brushes are also screw mounted on the hood apparatus.

Figure 2:
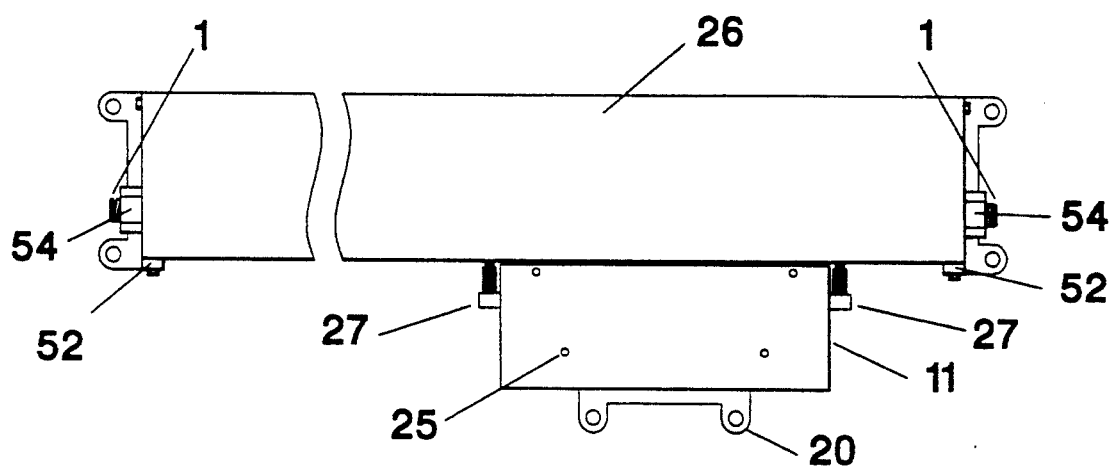
FIG. 2 is a top view of the linear drive system implemented with associated cover system.

The present invention is further illustrated by FIG. 2, which is also a top view, but not in cross-section. A frame structure (26) covers the lead screw (1) and lead nut. The hood apparatus (11) is attached to the motor and nut brace and the nut brace with hood mounting screws (25). A load mounting bracket (20) is attached to the hood apparatus. Brushes (27) are attached to the outside of the hood apparatus. There is a screw clamp (52) for retaining the end of the band and a lead screw end nut (54).

Figure 3A:
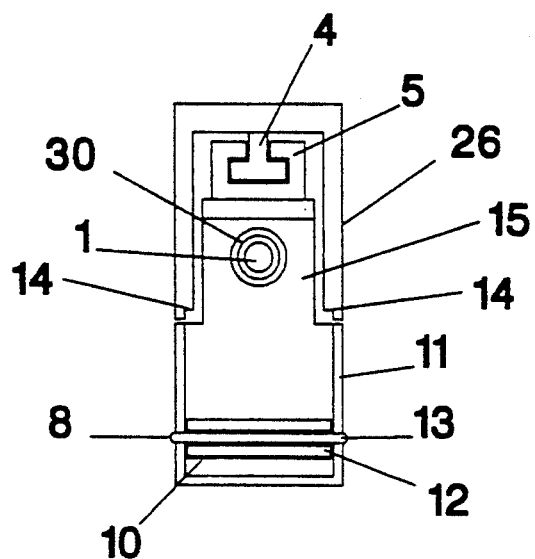
FIG. 3A is an end view in cross-section of the linear drive system implemented with associated cover system.

FIG. 3A, an end view in cross-section, further illustrates this embodiment of the present invention. It shows the linear slide (4) and one of the slide blocks (5). The lead screw (1) and a ball bearing (30) disposed around the lead screw are also illustrated. A lifting roller assembly (8), shown lifting the band (10), is comprised of a pin (13) and an aluminum cylinder (12). The lifting roller assembly is attached to the hood apparatus (11) by means of the pin. The frame structure (26) is hollow and has two surfaces (14) in substantially the same plane, with an opening between the two surfaces. In FIG. 3A, said surfaces are in the horizontal plane.

Figure 3B:
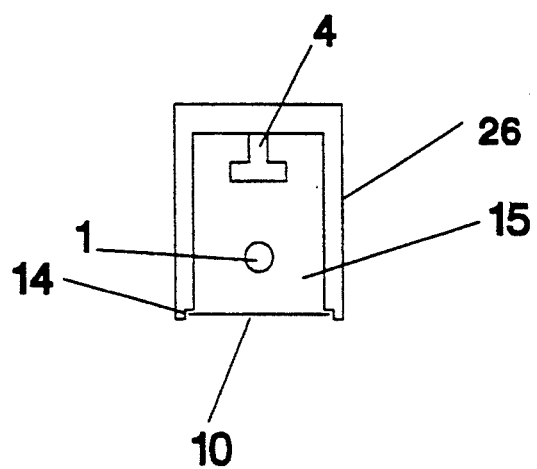
FIG. 3B is also an end view in cross-section of the linear drive system implemented with associated cover system.

FIG. 3B is also an end view in cross-section, except the hood apparatus assembly is not present in this cross-section. The frame structure (26) is attached to the linear slide (4). The lead screw (1) is disposed within the frame structure and the band (10) rests against the two surfaces (14) to close the opening (15).

Figure 4:
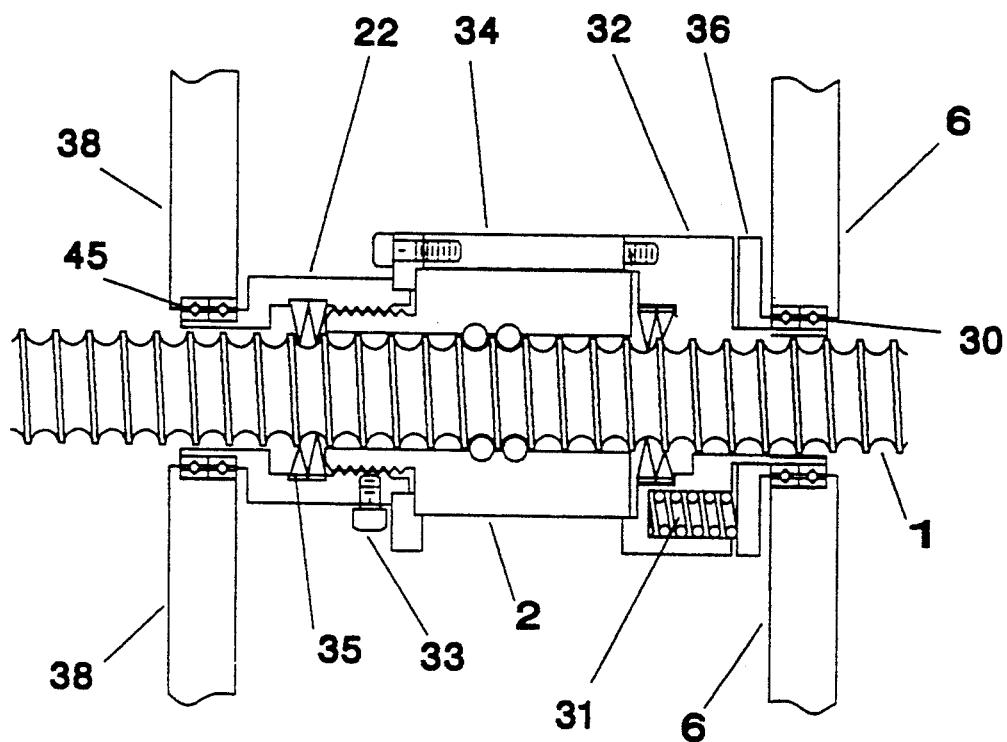
FIG. 4 is a top view in cross-section of an implementation of the ball nut assembly.

FIG. 4 is a top view in cross-section of an embodiment of the lead nut assembly, which can be implemented in the present invention. In this embodiment the lead screw (1) is a ball screw and the lead nut (2) is a ball nut. Connected to the ball nut is the nut pulley (22), the connection to which is tightened with a set screw (33). Within the nut pulley are wipers to clear dust, etc., from the ball screw (35). The end of the nut pulley is disposed within a ball bearing (45), which is set in the nut brace (38). On the other side of the ball nut is a nut end structure (32), which has a hole sufficient to allow the nut end structure to accept the lead screw and which is structurally connected to the nut pulley with a support pillar (34). In this embodiment, the connection is made with three support pillars 120 degrees apart, such that only one is shown in this cross-section. Disposed within the nut end structure is a spring (31) which presses against a pressure plate (36) which preloads the ball bearing (30), which is disposed within the motor and nut brace (6). As with the support pillars, there are three springs disposed within the nut end structure 120 degrees apart.

Figure 5A:
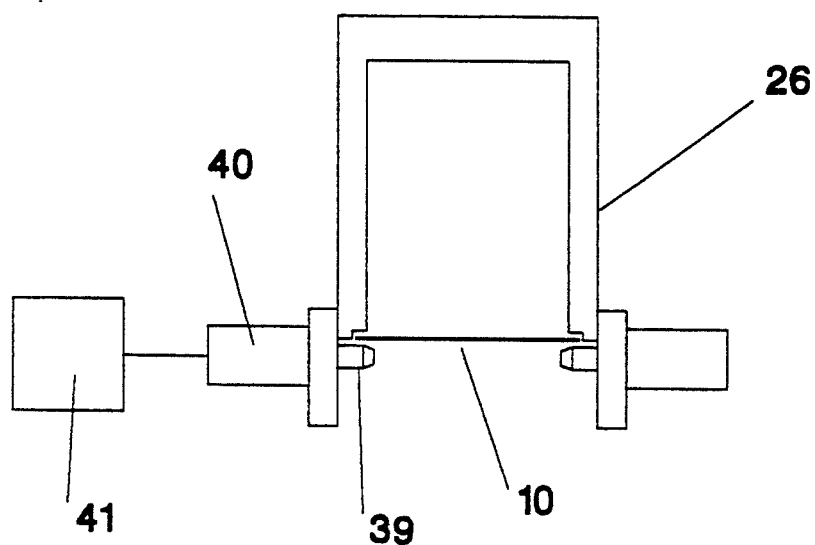
FIG. 5A is an end view in cross-section of the first embodiment utilizing retaining pins operatively connected to solenoids.

FIG. 5A (end view in cross-section) illustrates means for retaining the band against the surfaces. The band (10) is retained against the surfaces (14) by retaining means, which operates by releasing the band as a function of the position of the hood apparatus. In this particular embodiment, the retaining means consists of retaining structures (here, retaining pins (39)), which are operatively connected to solenoids (40). The solenoids, in turn, are operatively connected to a controller (41) which monitors the position of the hood apparatus, such that the retaining pins are withdrawn as required to allow passage of the hood apparatus.

Figure 5B:
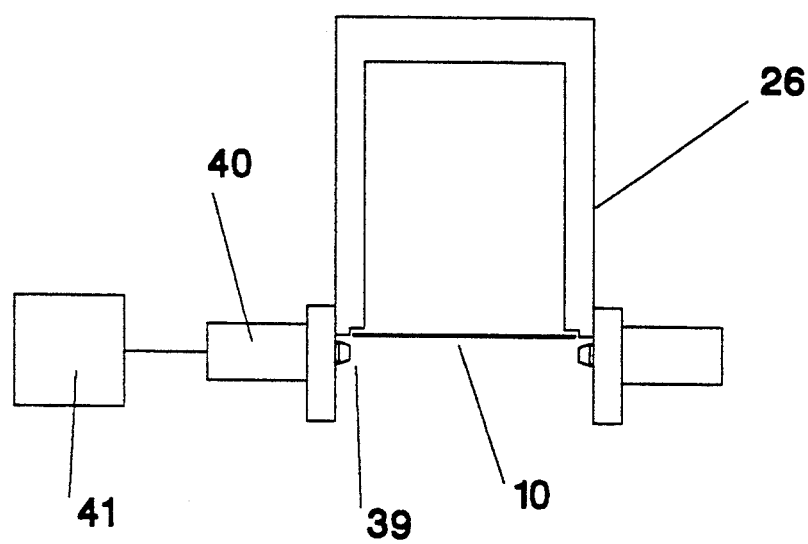
FIG. 5B is an end view in cross-section of the first embodiment utilizing retaining pins operatively connected to solenoids with the pins in a retracted position.

FIG. 5B (end view in cross-section) further illustrates the operation of retaining structures as retaining means. In FIG. 5B the solenoids have been activated by the controller such that the retaining pins have been withdrawn and the band released.

Figure 5C:
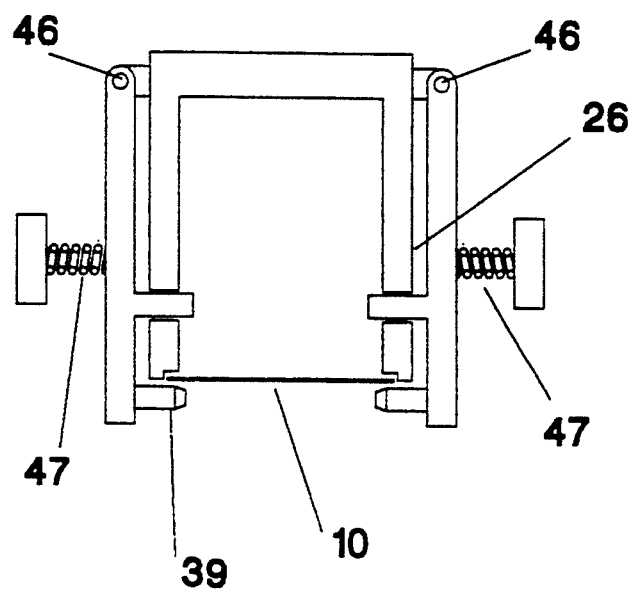
FIG. 5C is an end view in cross-section of the first embodiment utilizing retaining pins pivotally connected to the frame structure.

FIG. 5C (end view in cross-section) illustrates another type of retaining means which releases the band as a function of the position of the hood apparatus. Retaining structures, in this embodiment also retaining pins (39), are pivotally connected to the frame structure (26) and are positioned such that they are pivoted around the pivots (46) by force of the moving hood apparatus, thereby releasing the band. Spring means (47) can be utilized with the pivots such that the retaining pins are returned to position after the hood apparatus passes.

Figure 6:
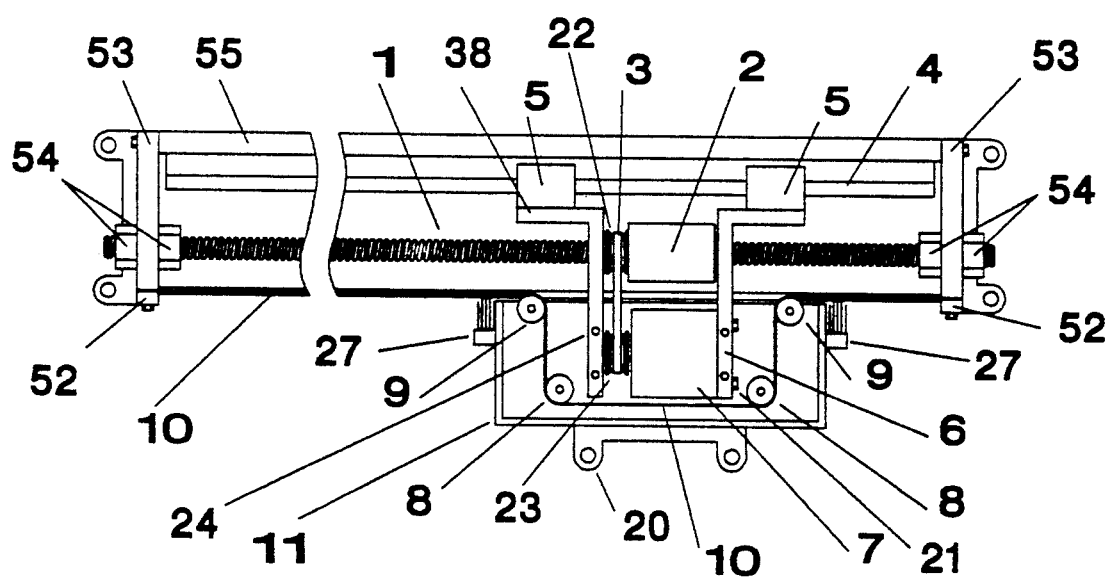
FIG. 6 is a top view in cross-section of a second embodiment of the dust cover system.

A second embodiment of the present invention is illustrated in FIG. 6, a top view in cross-section of said embodiment. This second embodiment also utilizes the present system as a dust cover system. The parts of FIG. 6 are the same as FIG. 1, except that ball bearings

(18) are structurally attached to the motor and nut frame and the nut frame.

Figure 7:
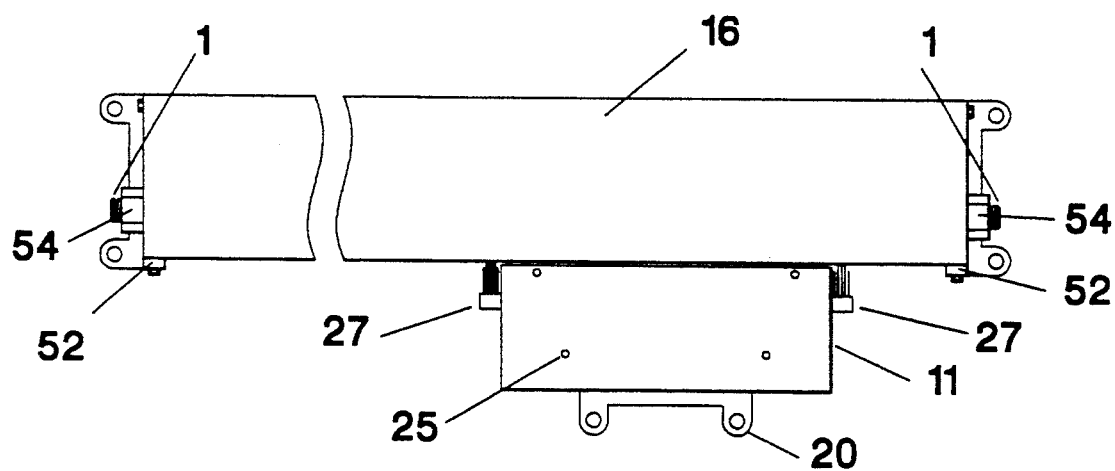
FIG. 7 is a top view of a second embodiment of the dust cover system.

The second embodiment is further illustrated by FIG. 7, which is also a top view, but not in cross-section. A elongated flexible member (16) covers the lead screw (1) and lead nut. The hood apparatus (11) is attached to the motor and nut brace and the nut brace with hood mounting screws (25). A load mounting bracket (20) is attached to the hood apparatus. Brushes (27) are attached to the outside of the hood apparatus for brushing the band as the hood apparatus is moved along the band.

Figure 8A:
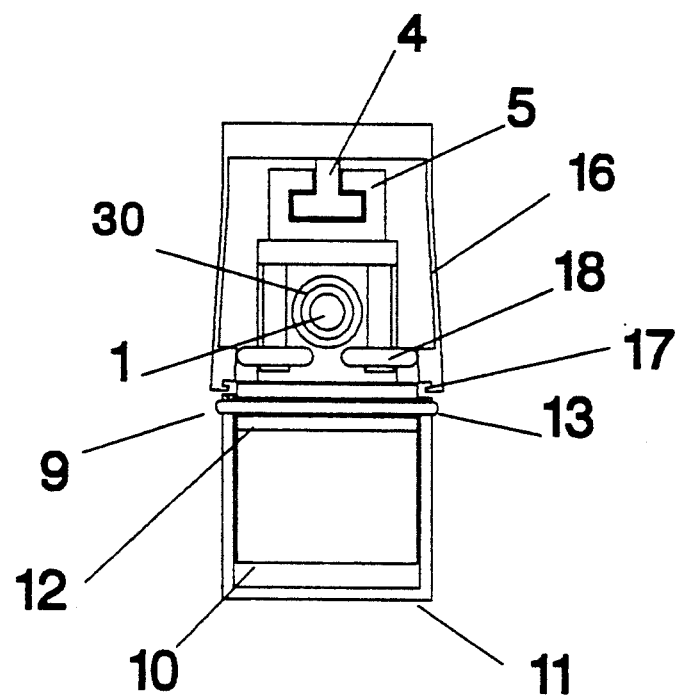
FIG. 8A is an end view in cross-section of the second version of the dust cover system showing the sides expanded and the band released.

FIG. 8A is an end view in cross-section of the second embodiment. It has ball bearings (18). The frame structure includes two elongated flexible members (16) shown in cross-section. The elongated flexible members each have a groove (17) sufficiently wide to accept an edge of the band (10). The elongated flexible members in this second embodiment are aluminum extrusions, but could also be made from other flexible and resilient material. In FIG. 8A, the ball bearings are shown pushing the elongated flexible members open such that the band is released.

Figure 8B:
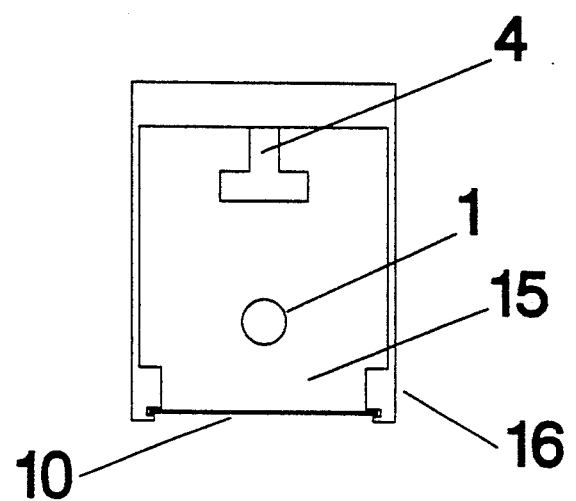
FIG. 8B is an end view in cross-section of the second version of the dust cover system showing the sides closed on the band.

FIG. 8B is also an end view in cross-section of the second embodiment, but the cross-section is of a portion of the system where the hood apparatus and the ball bearings are absent. FIG. 8B shows the elongated flexible members (16) in a closed position with the edges of the band (10) disposed within the grooves (17). There is a linear slide (4) and a lead screw (1).

Figure 9:
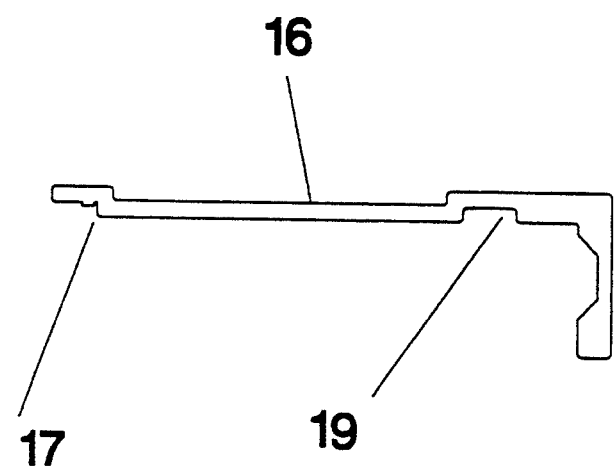
FIG. 9 is a cross-section of an elongated flexible member showing a portion to facilitate expansion.

FIG. 9 is an end view in cross-section of a particular elongated flexible member (16) of the second embodiment. The elongated flexible member, in this embodiment, is an aluminum extrusion, but it can otherwise be constructed. It has a groove (17) and a narrow portion (19) to facilitate bending.

Figure 10:
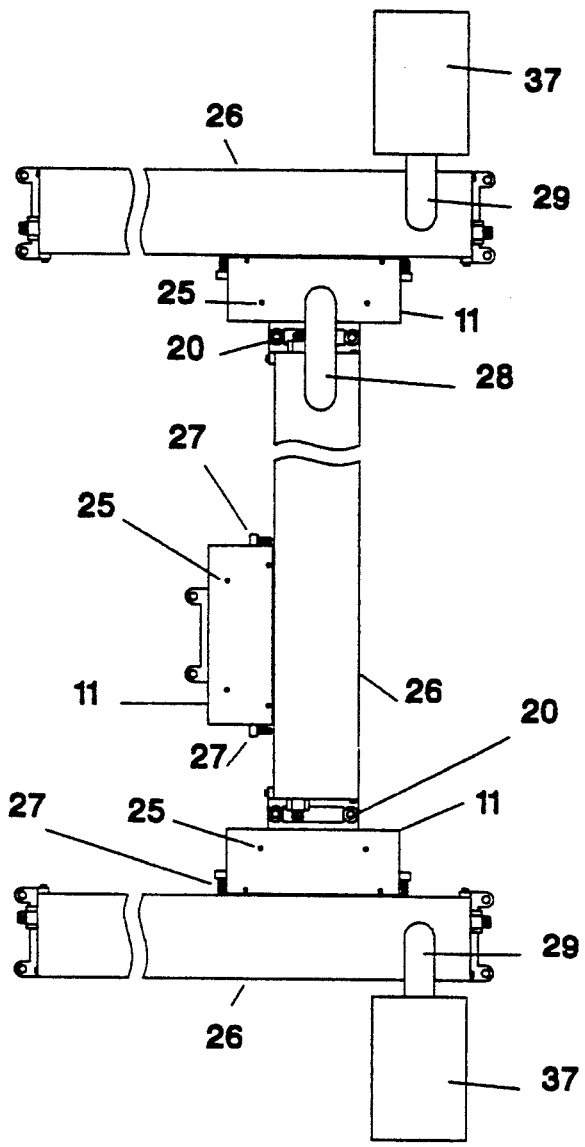
FIG. 10 is a top plan view illustrating the use of the linear drive system implemented with associated cover system in a gantry system.

FIG. 10 is a top view of three cover systems implemented in a gantry system. Each cover system has an hood apparatus (11), hood mounting screws (25), band brushes (27) connected to the hood apparatus, and frame structures (26). In this implementation, the gantry is connected by load mounting brackets (20). The gantry system also has a vacuum system comprising vacuum means (37), a supply pipe (29) between the vacuum means and a frame structure, and an interconnecting air pipe (28) connected between a hood apparatus and a frame structure of the gantry. The vacuum system removes dust and other particles which enter the cover system. The vacuum means can be exchanged with air pressure means so that air pressure prevents dust and other particles from entering the system in the first place.

Figure 11:
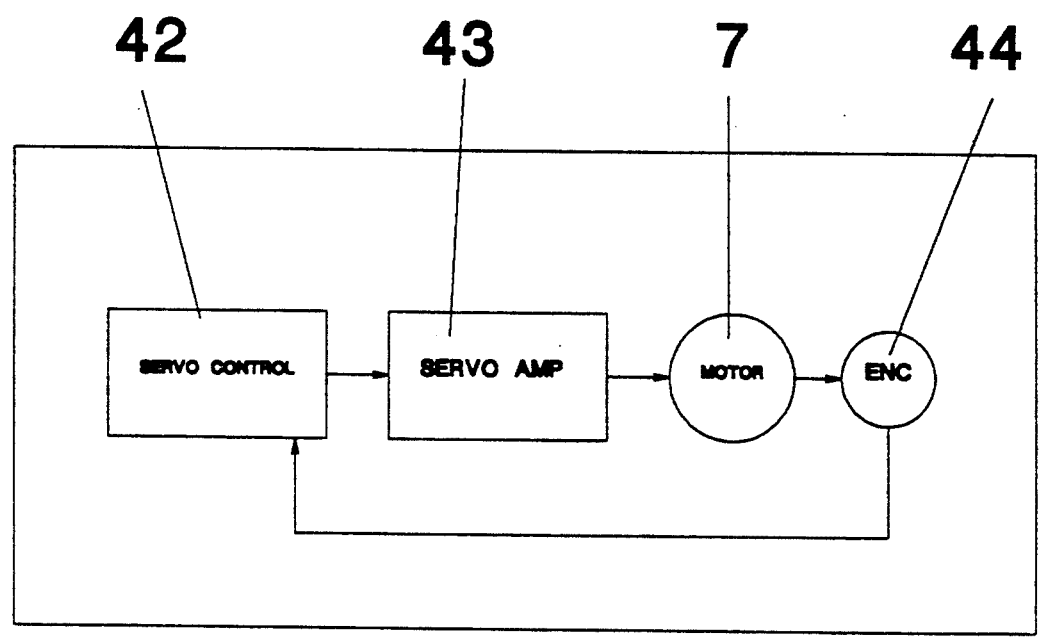
FIG. 11 is a block diagram illustrating the motor servo system which can be disposed within or without the hood apparatus.

FIG. 11 is a block diagram illustrating a servo control system for the motor in either of the two embodiments of the present invention shown. Such a servo control system can be placed within the hood apparatus, thereby simplifying any wiring leading to the hood apparatus and the device. This servo control system can also be placed within a box which is connected to and travels with the hood apparatus.

Figure 12:
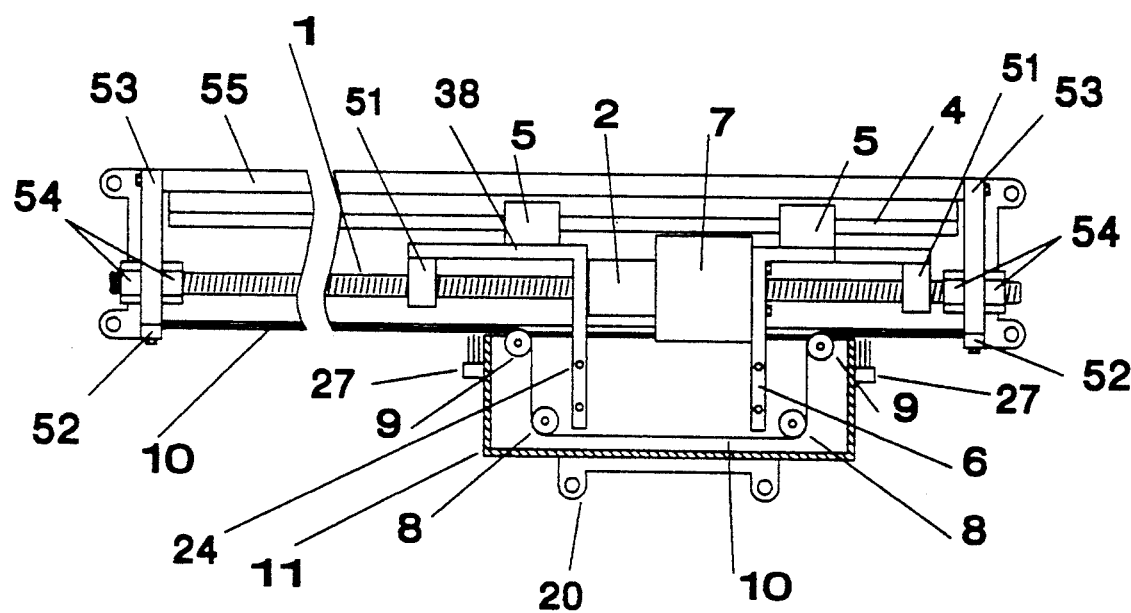
FIG. 12 is a top view in cross-section of the linear drive system implemented with associated cover system wherein the lead screw is disposed within the drive motor.

Another embodiment of the present invention is shown in FIG. 12. The embodiment of FIG. 12 is substantially the same as illustrated in FIG. 1. However, FIG. 12 illustrates an embodiment wherein the motor (7) is operatively connected to the lead nut (2) such that the lead nut is driven directly by the motor. The motor has an opening sufficiently large to allow the lead screw (1) to be disposed through it. FIG. 12 further illustrates steady braces (51) utilized to steady any vibration of the lead screw.

Figure 13:
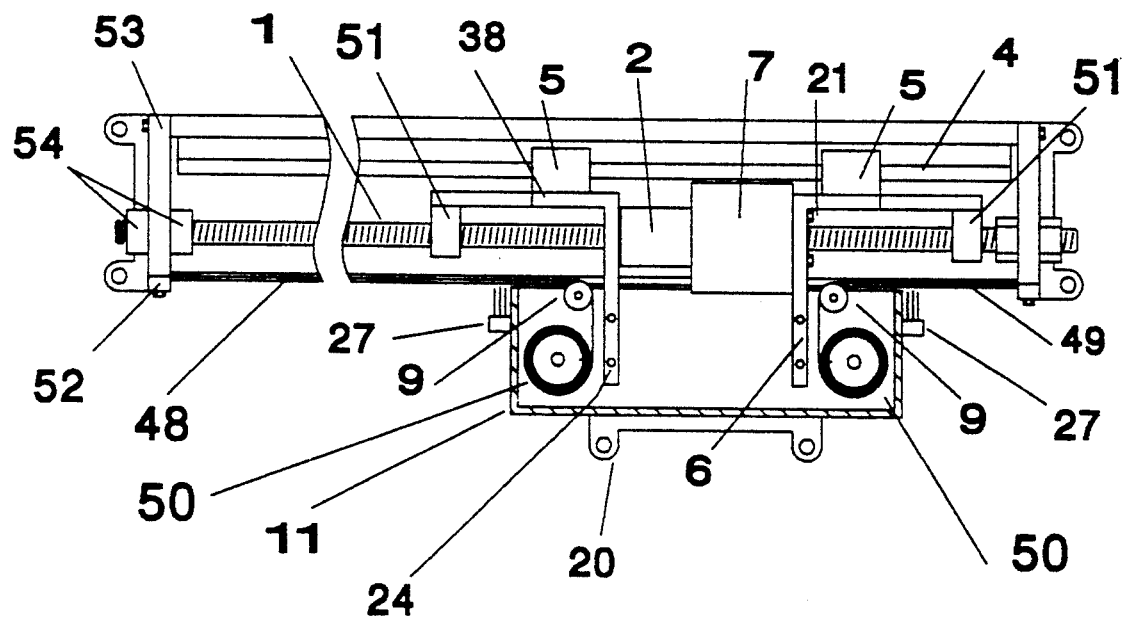
FIG. 13 is a top view in cross-section of the linear drive system implemented with a cover system utilizing two bands which are wound by reeling means disposed within the hood apparatus.

FIG. 13 illustrates an embodiment of the linear drive system utilizing a different cover system. In FIG. 13, the cover system comprises a first band (48) and a second band (49). Each band covers a portion of the opening to be covered with one end of each band retained by a screw clamp (52). Reeling means (50), which is disposed within the hood apparatus and attached therein, takes up each band as the hood apparatus is moved toward the retained end of the band. As the hood apparatus moves away from the retained end, the band is unreeled. Said reeling means can include a take up reel with a spring motor similar to those found in window shades or an electric motor.

OPERATION

The basic operation of the present invention is illustrated by FIGS. 1, 2, 3A and 3B. There are two surfaces (14) which form an opening which the present invention is to cover. There is a hood apparatus (11) which has at least one bridge structure (8) disposed within the hood apparatus, with both ends attached to the hood apparatus. To cover the opening, a band (10) is positioned over the length of the opening and further mounted over the bridge structure. As such, as the hood apparatus is moved along the band, at least a portion of the band under the hood apparatus is lifted from the surfaces. Band which has been lifted from the surface is returned to the surface as the hood apparatus continues to move along the band. Therefore, the present invention serves to cover the opening, yet allow access to the opening by a device which is at least partially disposed within the hood apparatus and travels with the hood apparatus.

FIGS. 1, 2, 3A and 3B, also illustrate a particular embodiment of the present invention used as a dust cover. The band (10) is constructed of a thin flexible material, and the surfaces which form the opening are flat, substantially within the same plane and are part of a frame structure (26). There are two lifting bridge structures (8), which in this embodiment are roller assemblies. There are two additional roller assemblies (9) disposed within the hood apparatus which are positioned closer to the opening than the lifting roller assemblies. The dust cover system operates such that as the hood apparatus is moved, the lifting roller assemblies lift the band from the opening and the two additional roller assemblies, or retaining assemblies, press the band toward the opening. The use of roller assemblies, as opposed to other bridge structures, facilitates the movement of the hood apparatus as friction is reduced.

In this embodiment, the hood apparatus is caused to move by a motor (7) operatively connected to a lead nut (2) on a lead screw (1). The motor is operatively connected to a pulley (23), which turns a drive belt (3), which turns a second pulley (22) operatively connected to the lead nut, thereby causing the structure mounted on the motor and lead nut, which includes the hood apparatus, to move along the lead screw. Because the lead screw is substantially parallel to the opening (15), the hood apparatus travels along the opening. A load mounting bracket (20) allows the hood apparatus to move a load by virtue of the movement of the hood apparatus.

FIGS. 5A and 5B illustrate means for retaining the band against the surfaces. The band (10) is retained against the surfaces (14) by retaining means, which operates by releasing the band as a function of the position of the hood apparatus. In this particular embodiment, the retaining means consist of retaining pins (39), which are operatively connected to solenoids (40). The solenoids, in turn, are operatively connected to a controller (41) which monitors the position of the hood apparatus, such that the retaining pins are withdrawn as required to allow passage of the hood apparatus.

FIG. 5B further illustrates the operation of the retaining pins as retaining means. In FIG. 5B, the solenoids have been activated by the controller such that the retaining pins have been withdrawn and the band released.

Other retaining means can be used. For example, a pin structure can be pivotally connected to the frame structure and positioned so as to retain the band but also to be pushed partially around its pivot by the hood apparatus as the hood apparatus passes, so as to release the portion of the band under the hood apparatus. FIG. 5C (end view in cross-section), this other type of retaining means is illustrated. Retaining structures, in this embodiment also retaining pins (39), are pivotally connected to the frame structure (26) and are positioned such that they are pivoted around the pivots (46) by force of the moving hood apparatus, thereby releasing the band. Spring means (47) can be utilized with the pivots such that the retaining pins are returned to position after the hood apparatus passes.

FIGS. 6, 7, 8A, 8B, and 9, illustrate a second embodiment of the present invention. This second embodiment, fundamentally, operates the same as the first embodiment. However, rather than have a rigid frame structure with two surfaces, this second embodiment has two elongated, flexible members (16), each having a side and a groove (17) in said side. There are also ball bearings (18) attached to the hood apparatus. The grooves are positioned so as to accept the edges of the band (10). As the hood apparatus is moved, the ball bearings serve to press the two flexible, elongated members apart so that the following occurs:

(1) In the direction of movement of the hood apparatus, the band is released from the grooves by virtue of expansion of the opening and the released portion of the band is lifted by force of the roller assembly; and (2) in the direction opposite of the movement of the hood apparatus, the structural members flex back toward each other such that the released portion of the band is reinserted into the grooves.

Formation of a narrow portion (19) in each elongated, flexible member serves to facilitate the bending of the member.

FIG. 11 illustrates the implementation of a vacuum or air pressure system with a cover system. An air pressure system or vacuum is operatively connected to the cover system by a supply hose. A vacuum system will remove dust, etc., from the cover system, while an air pressure system will prevent dust, etc., from coming into the cover system in the first place.

SUMMARY, RAMIFICATIONS, AND SCOPE

Although the description above contains many specificities, these should not be construed as limiting the scope of the present invention or its applications but as merely providing illustrations of some of the presently preferred embodiments of this invention.

The present invention can have many variations. For example, the present invention can have, among others, the following variations:

a. The hood apparatus can have various shapes, such as circular, oval, trapezoidal, triangular, etc.;

b. there can be additional roller assemblies or other bridge structures;

c. the hood apparatus may not enclose completely a protected device;

d. surfaces which create an opening to be covered may not be linear;

e. surfaces which create an opening to be covered may not be flat;

f. surfaces which create an opening to be covered may be very thin;

g. additional surfaces which support the band may be interposed between the surfaces which create an opening to be covered;

h. the band may be made of links or a mesh;

i. the band may be structural;

j. a motor may be concentric with a lead screw and turn directly a lead nut;

k. movement of the hood apparatus may be caused by means other than utilization of a lead screw;

l. the hood apparatus can form part of a structure which requires access to the opening;

m. a bridge structure may not be connected to two sides of the hood apparatus;

n. a bridge structure might touch one or both the surfaces which form the opening to be covered;

o. the hood apparatus might be moved by driving a roller assembly;

p. the cover may be for purposes other than preventing contamination, such as preventing electric shock or physical injury;

q. the linear drive system may utilize a different cover system or may have no cover system at all; and/or r. the lead screw will not necessarily be proximate to the linear slide.

Thus, the scope of the invention should be determined by the appended claims and their legal equivalents, rather than by the examples given.

We claim:

1. A cover system for an opening comprising:

a. A first surface;

b. a second surface positioned relative to said first surface such that there is an opening between the two surfaces;

c. a bridge structure with one side at least as long as the opening is wide;

d. a support structure, which is movable along the opening, which supports the bridge structure in a position over and across the opening, wherein said support structure is a structure comprising a hood apparatus having an inside and an outside with a hole therein sufficiently large for accepting the width of the band, with said hood apparatus being mounted over the opening to be covered such that the bridge structure is disposed within the inside of said hood apparatus;

e. a band which is mounted over the opening such that it covers at least part of the opening and is also mounted over the bridge structure such that the band is lifted from the opening as the support structure is moved along the band;

f. wherein the hood apparatus covers a motor; and g. wherein the bridge structure is positioned sufficiently distant from the opening so as to lift the band over the motor.

2. The cover system of claim 1 wherein the motor is operatively connected to a lead nut on a lead screw.

3. The cover system of claim 2 wherein the lead nut is turned by a drive belt operatively connected to the motor and the lead nut.

4. The cover system of claim 1 wherein said bridge structure is a roller assembly.

5. The cover system of claim 4 wherein a second roller assembly is disposed within the hood apparatus and connected thereto and is positioned so as to press the band toward the opening.

6. The cover system of claim 1 wherein retaining means retains the band with respect to one of the surfaces.

7. The cover system of claim 1 wherein a supply pipe operatively connected to an air pressure system is interposed within the cover system.

8. The cover system of claim 1 wherein a supply pipe operatively connected to a vacuum system is interposed within the cover system.

9. A cover system for an opening comprising:
   a. A first surface;
   b. a second surface positioned relative to said first surface such that there is an opening between the two surfaces;
   c. a bridge structure with one side at least as long as the opening is wide;
   d. a support structure, which is movable along the opening, which supports the bridge structure in a position over and across the opening wherein said support structure is a structure comprising a hood apparatus having an inside and an outside with a hole therein sufficiently large for accepting the width of the band, with said hood apparatus being mounted over the opening to be covered such that the bridge structure is disposed within the inside of said hood apparatus;
   e. a band which is mounted over the opening such that it covers at least part of the opening and is also mounted over the bridge structure such that the band is lifted from the opening as the support structure is moved along the band;
   f. retaining means which retains the band with respect to one of the surfaces; and
   g. operating means which causes the retaining means to release the band as a function of the position of the hood apparatus.

10. The cover system of claim 9 wherein said retaining means comprises a retaining structure and said operating means is a solenoid operatively connected to the retaining structure and to a controller, such that the controller activates the solenoid as a function of the position of the hood apparatus causing the retaining structure to be withdrawn, thereby releasing the band.

11. The cover system of claim 9 wherein there is a structure in proximity to the band and said retaining means comprises a retaining structure pivotally connected to said first described proximate structure.

12. The cover system of claim 11 wherein the retaining structure is positioned such that it is pivoted by force of the hood apparatus as the hood apparatus passes said retaining structure.

13. A cover system for an opening comprising:
   a. A first surface;
   b. a second surface positioned relative to said first surface such that there is an opening between the two surfaces;
   c. a bridge structure with one side at least as long as the opening is wide;
   d. a support structure, which is movable along the opening, which supports the bridge structure in a position over and across the opening, wherein said support structure is a structure comprising a hood apparatus having an inside and an outside with a hole therein sufficiently large for accepting the width of the band, with said hood apparatus being mounted over the opening to be covered such that the bridge structure is disposed within the inside of said hood apparatus;
   e. a band which is mounted over the opening such that it covers at least part of the opening and is also mounted over the bridge structure such that the band is lifted from the opening as the support structure means is moved along the band; and
   f. a brush is connected to the hood apparatus and positioned such that it brushes the band as the hood apparatus moves along the band.

14. A cover system for an opening comprising:
   a. a first elongated, flexible member having a side and a groove in said side;
   b. a second elongated, flexible member having a side and a groove in said side, said second member positioned with respect to said first member such that the grooved sides face each other, such that the grooves are parallel to each other, and such that the members form an opening;
   c. a bridge structure with one side at least as long as the opening is wide;
   d. a bridge support structure, which is movable along the opening and supports the bridge structure in a position over and across the opening;
   e. a band interposed within the groove of the first member and the groove of the second member with a portion of said band mounted over said bridge structure;
   f. means to press the two flexible members apart so as the bridge structure is moved along the opening the following occurs:
   (1) In the direction of movement of the bridge structure, the band is released from the grooves by virtue of expansion of the opening and the released portion of the band is lifted by force of the bridge structure; and
   (2) in the direction opposite of the movement of the bridge structure, the flexible members flex back toward each other such that the released portion of the band is reinserted into the grooves.

15. The cover system of claim 14 wherein said bridge support structure is a structure comprising a hood apparatus having an inside and an outside with a hole therein sufficiently large for accepting the width of the band, with said hood apparatus being mounted over the opening to be covered with the hole positioned toward the opening and such that the bridge structure is disposed within the inside of said hood apparatus.

16. The cover system of claim 15 wherein the hood apparatus covers a device which is interposed into the opening and which is movable along the opening.

17. The cover system of claim 16 wherein the bridge structure is positioned sufficiently distant from the opening so as to lift the band over the device.

18. The cover system of claim 17 wherein the device is a motor.

19. The cover system of claim 18 wherein the motor is operatively connected to a lead nut on a lead screw.

20. The cover system of claim 19 wherein the lead nut is turned by a drive belt operatively connected to the motor and the lead nut.

21. The cover system of claim 15 wherein said bridge structure is a roller assembly.

22. The cover system of claim 21 wherein a second roller assembly is disposed within the hood apparatus and connected thereto and is positioned so as to press the band toward the opening.

23. The cover system of claim 15 wherein a supply pipe operatively connected to an air pressure system is interposed within the cover system.

24. The cover system of claim 15 wherein a supply pipe operatively connected to a vacuum system is interposed within the cover system.

25. The cover system of claim 15 wherein the elongated, flexible members are aluminum extrusions.

26. The cover system of claim 15 wherein the means to press the two flexible members apart is a plurality of ball bearings.

27. A linear drive system and cover therefor comprising:
   a. a linear slide having a front;
   b. a first linear slide block operatively engaged with said linear slide such that it can travel along the front of said linear slide;
   c. a second linear block operatively engaged with said linear slide such that it can travel along the front of said linear slide;
   d. a lead screw;
   e. a lead nut operatively engaged with said lead screw such that it can travel along said lead screw by virtue of rotation of the lead nut;
   f. a nut pulley, having a hole therethrough sufficiently large to accept the lead screw, connected to and positioned with respect to said lead nut such that the lead screw is disposed through said nut pulley and rotation of the nut pulley causes the lead nut to rotate;
   g. a support structure supporting said lead screw in a position substantially parallel to the linear slide and in front of said linear slide;
   h. a nut brace connected to said first linear block having a hole therethrough therein sufficiently large to accept the lead screw and positioned such that the lead screw is disposed within said nut brace hole and such that the nut brace is proximate to the nut pulley;
   i. a motor and nut brace connected to said second linear block having a hole therethrough therein sufficiently large to accept the lead screw and positioned such that the lead screw is disposed through said motor and nut brace hole, such that the motor and nut brace is proximate to the lead nut, and such that the lead nut and nut pulley are sandwiched between said nut brace and said motor and nut brace;
   j. structural means to maintain the relative position of the motor and nut brace to the nut brace;
   k. a motor mounted on the motor and nut brace and positioned between the nut brace and the motor and nut brace;
   l. motor pulley operatively connected to said motor and positioned such that it can share a common drive belt with the nut pulley;
   m. a drive belt positioned operatively between the nut pulley and the motor pulley such that as the motor causes the motor pulley to rotate, the lead nut rotates, thereby causing the lead nut to move linearly along the lead screw, thereby causing the motor and nut brace and the nut brace to move; and
   n. wherein the lead nut and motor are covered by a cover system comprising a first surface, a second surface positioned relative to said first surface such that there is a covered opening between the two surfaces, a bridge structure with one side at least as long as the covered opening is wide, a bridge support structure which is movable along the covered opening, which supports the bridge structure in a position over and across the covered opening, and a band which is mounted over the covered opening such that it covers at least part of the covered opening and is also mounted over the bridge structure such that the band is lifted from the covered opening as the bridge support structure is moved along the band.

28. The linear drive system and cover system of claim 27 wherein said bridge support structure is a structure comprising a hood apparatus having an inside and an outside with a hole therein sufficiently large for accepting the width of the band, with said hood apparatus being mounted over the covered opening such that the bridge structure is disposed within the inside of said hood apparatus.

29. The linear drive system and cover system of claim 28 wherein the hood apparatus covers a device which is movable along the covered opening.

30. The linear drive system and cover system of claim 29 wherein the bridge structure is positioned sufficiently distant from the covered opening so as to lift the band over the device.

31. The linear drive system and cover system of claim 30 wherein the device is the motor.

32. The linear drive system and cover system of claim 27 wherein said bridge structure is a roller assembly.

33. The linear drive system and cover system of claim 32 wherein a second roller assembly is disposed within the hood apparatus and connected thereto and is positioned so as to press the band toward the covered opening.

34. The linear drive system and cover system of claim 28 wherein retaining means retains the band with respect to one of the surfaces.

35. The linear drive system and cover system of claim 34 wherein operating means causes the retaining means to release the band as a function of the position of the hood apparatus.

36. The linear drive system and cover system of claim 35 wherein said retaining means comprises a retaining structure and said operating means is a solenoid operatively connected to the retaining structure and to a controller, such that the controller activates the solenoid as a function of the position of the hood apparatus causing the retaining structure to be withdrawn, thereby releasing the band.

37. The linear drive system and cover system of claim 35 wherein there is a structure in proximity to the band and said retaining means comprises a retaining structure pivotally connected to said first described proximate structure.

38. The linear drive system and cover system of claim 37 wherein the retaining structure is positioned such that it is pivoted by force of the hood apparatus as the hood apparatus passes said retaining structure.

39. The linear drive system and cover system of claim 28 wherein a supply pipe operatively connected to an air pressure system is interposed within the linear drive system and cover system.

40. The linear drive system and cover system of claim 28 wherein a supply pipe operatively connected to a vacuum system is interposed within the linear drive system and cover system.

41. The linear drive system and cover system of claim 28 wherein a brush is connected to the hood apparatus by connecting means and positioned such that it brushes the band as the hood apparatus moves along the band.

42. The linear drive system of claim 27 in which steady braces are implemented to dampen vibration of the lead screw.

43. A linear drive system and cover therefor comprising:
   a. a linear slide having a front;
   b. a first linear slide block operatively engaged with said linear slide such that it can travel along the front of said linear slide;
   c. a second linear block operatively engaged with said linear slide such that it can travel along the front of said linear slide;
   d. a lead screw;
   e. a lead nut operatively engaged with said lead screw such that it can travel along said lead screw by virtue of rotation of the lead nut;
   f. a nut pulley, having a hole therethrough sufficiently large to accept the lead screw, connected to and positioned with respect to said lead nut such that the lead screw is disposed through said nut pulley and rotation of the nut pulley causes the lead nut to rotate;
   g. a support structure supporting said lead screw in a position substantially parallel to the linear slide and in front of said linear slide;
   h. a nut brace connected to said first linear block having a hole therethrough therein sufficiently large to accept the lead screw and positioned such that the lead screw is disposed within said nut brace hole and such that the nut brace is proximate to the nut pulley;
   i. a motor and nut brace connected to said second linear block having a hole therethrough therein sufficiently large to accept the lead screw and positioned such that the lead screw is disposed through said motor and nut brace hole, such that the motor and nut brace is proximate to the lead nut, and such that the lead nut and nut pulley are sandwiched between said nut brace and said motor and nut brace;
   j. structural means to maintain the relative position of the motor and nut brace to the nut brace;
   k. a motor mounted on the motor and nut brace and positioned between the nut brace and the motor and nut brace;
   l. motor pulley operatively connected to said motor and positioned such that it can share a common drive belt with the nut pulley;
   m. a drive belt positioned operatively between the nut pulley and the motor pulley such that as the motor causes the motor pulley to rotate, the lead nut rotates, thereby causing the lead nut to move linearly along the lead screw, thereby causing the motor and nut brace and the nut brace to move; and
   n. wherein the lead nut and motor are covered by a cover system comprising a first elongated, flexible member having a side and a groove in said side, a second elongated, flexible member having a side and a groove in said side, said second member positioned with respect to said first member such that the grooved sides face each other, such that the grooves are parallel to each other, and such that the members form a covered opening, a bridge structure with one side at least as long as the covered opening is wide, a bridge support structure, which is movable along the covered opening, which supports the bridge structure in a position over and across the covered opening, a band interposed within the groove of the first member and the groove of the second member with a portion of said band mounted over said bridge structure, means to press the two flexible members apart so as the bridge structure is moved along the covered opening the following occurs:
   (1) In the direction of movement of the bridge structure, the band is released from the grooves by virtue of expansion of the covered opening and the released portion of the band is lifted by force of the bridge structure; and
   (2) in the direction opposite of the movement of the bridge structure, the flexible members flex back toward each other such that the released portion of the band is reinserted into the grooves.

44. The linear drive system and cover system of claim 43 wherein the bridge support structure is a structure comprising a hood apparatus having an inside and an outside with a hole therein sufficiently large for accepting the width of the band, with said hood apparatus being mounted over the covered opening with the hold positioned toward the covered opening and such that the bridge structure is disposed within the inside of said hood apparatus.

45. The linear drive system and cover system of claim 44 wherein the hood apparatus covers a device which is interposed into the covered opening and which is movable along the covered opening.

46. The linear drive system and cover system of claim 45 wherein the bridge structure is positioned sufficiently distant from the covered opening so as to lift the band over the device.

47. The linear drive system and cover system of claim 46 wherein the device is the motor.

48. The linear drive system and cover system of claim 44 wherein bridge structure is a roller assembly.

49. The linear drive system and cover system of claim 48 wherein a second roller assembly is disposed within the hood apparatus and connected thereto and is positioned so as to press the band toward the covered opening.

50. The linear drive system and cover system of claim 44 wherein a supply pipe operatively connected to an air pressure system is interposed within the linear drive system and cover system.

51. The linear drive system and cover system of claim 44 wherein a supply pipe operatively connected to a vacuum system is interposed within the linear drive system and cover system.

52. The linear drive system and cover system of claim 44 wherein the elongated, flexible members are aluminum extrusions.

53. The linear drive system and cover system of claim 44 wherein the means to press the two flexible members apart is a plurality of ball bearings.

54. A linear drive system comprising:
a. a load;
b. lead screw;
c. a lead nut operatively engaged with to said lead screw such that said lead nut can travel along said lead screw by virtue of rotation of the lead nut;
d. a load engaging structure engaging both the lead nut and the load such that as the lead nut travels along the lead screw, the load is moved;
e. a motor operatively engaged with the lead nut such that said motor operates to rotate the lead nut; and
f. wherein the lead nut is covered by a cover system comprising a first elongated, flexible member having a side and a groove in said side, a second elongated, flexible member having a side and a groove in said side, said second member positioned with respect to said first member such that the grooved sides face each other, such that the grooves are parallel to each other, and such that the members form a covered opening, a bridge structure with one side at least as long as the covered opening is wide, a bridge support structure, which is movable along the covered opening, which supports the bridge structure in a position over and across the covered opening, a band interposed within the groove of the first member and the groove of the second member with a portion of said band mounted over said bridge structure, and means to press the two flexible members apart so as the bridge structure is moved along the covered opening the following occurs:
(1) In the direction of movement of the bridge structure, the band is released from the grooves by virtue of expansion of the covered opening and the released portion of the band is lifted by force of the bridge structure; and
(2) in the direction opposite of the movement of the bridge structure, the flexible members flex back toward each other such that the released portion of the band is reinserted into the grooves.

55. The linear drive system and cover system of claim 54 wherein said bridge support structure is a structure comprising a hood apparatus having an inside and an outside with a hole therein sufficiently large for accepting the width of the band, with said hood apparatus being mounted over the covered opening to be covered such that the bridge structure is disposed within the inside of said hood apparatus.

56. A linear drive system comprising:
a. a load;
b. lead screw;
c. a lead nut operatively engaged with to said lead screw such that said lead nut can travel along said lead screw by virtue of rotation of the lead nut;
d. a load engaging structure engaging both the lead nut and the load such that, as the lead nut travels along the lead screw, the load is moved;
e. a motor operatively engaged with the lead nut such that said motor operates to rotate the lead nut; and
f. wherein the lead nut is covered by a cover system comprising a first surface, a second surface positioned relative to said first surface such that there is a covered opening between the two surfaces, a bridge structure with one side at least as long as the covered opening is wide, a bridge support structure, which is movable along the covered opening, which supports the bridge structure in a position over and across the covered opening, and a band which is mounted over the covered opening such that it covers at least part of the covered opening and is also mounted over the bridge structure such that the band is lifted from the covered opening as the bridge support structure is moved along the band.

57. The linear drive system and cover system of claim 56 wherein said bridge support structure is a structure comprising a hood apparatus having an inside and an outside with a hole therein sufficiently large for accepting the width of the band, with said hood apparatus being mounted over the covered opening with the hole positioned toward the covered opening and such that the bridge structure is disposed within the inside of said hood apparatus.

58. The linear drive system of claim 54, wherein a linear slide is positioned parallel to and facing the lead screw and is engaged by said load engaging structure such that the linear slide serves to guide the load engaging structure linearly.

59. The linear drive system of claim 54, wherein said motor is a motor having a hole therethrough sufficiently large to accept the lead screw and positioned such that the lead screw is disposed through the motor and the motor engages and drives directly the lead nut.

60. The linear drive system of claim 56, wherein a linear slide is positioned parallel to and facing the lead screw and is engaged by said load engaging structure such that the linear slide serves to guide the load engaging structure linearly.

61. The linear drive system of claim 56, wherein said motor is a motor having a hole therethrough sufficiently large to accept the lead screw and positioned such that the lead screw is disposed through the motor and the motor engages and drives directly the lead nut.

62. A linear drive system comprising:
a. a load;
b. lead screw;
c. a lead nut operatively engaged with to said lead screw such that said lead nut can travel along said lead screw by virtue of rotation of the lead nut;
d. a load engaging structure engaging both the lead nut and the load such that as the lead nut travels along the lead screw, the load is moved;
e. a motor operatively engaged with the lead nut such that said motor operates to rotate the lead nut; wherein the motor is controlled by a servo system comprising an encoder operatively connected to said motor, a servo controller operatively connected to said encoder for processing encoder signals, an amplifier operatively connected to said servo controller, with said amplifier operatively connected to said motor to drive said motor; and
f. wherein the lead nut is covered by a cover system comprising a first elongated, flexible member having a side and a groove in said side, a second elongated, flexible member having a side and a groove in said side, said second member positioned with respect to said first member such that the grooved sides face each other, such that the grooves are parallel to each other, and such that the members form a covered opening, a bridge structure with one side at least as long as the covered opening is wide, a bridge support structure, which is movable along the covered opening and supports the bridge structure in a position over and across the covered opening, a band interposed within the groove of the first member and the groove of the second member with a portion of said band mounted over said bridge structure, and means to press the two flexible members apart so as the bridge structure is moved along the covered opening the following occurs:

(1) In the direction of movement of the bridge structure, the band is released from the grooves by virtue of expansion of the covered opening and the released portion of the band is lifted by force of the bridge structure; and (2) in the direction opposite of the movement of the bridge structure, the flexible members flex back toward each other such that the released portion of the band is reinserted into the grooves.

63. The linear drive system and cover system of claim 62 wherein said bridge support structure is a structure comprising a hood apparatus having an inside and an outside with a hole therein sufficiently large for accepting the width of the band, with said hood apparatus being mounted over the covered opening such that the bridge structure is disposed within the inside of said hood apparatus.

64. The linear drive system and cover system of claim 63, wherein the amplifier is disposed within the hood apparatus.

65. The linear drive system and cover system of claim 64, wherein the servo controller is also disposed within the hood apparatus.

66. The linear drive system and cover system of claim 62, wherein the servo controller and amplifier are disposed within an enclosure connected to said load engaging structure.

67. A linear drive system comprising:
a. a load;
b. lead screw;
c. a lead nut operatively engaged with to said lead screw such that said lead nut can travel along said lead screw by virtue of rotation of the lead nut;
d. load engaging structure engaging both the lead nut and the load such that as the lead nut travels along the lead screw, the load is moved;
e. a motor operatively engaged with the lead nut such that said motor operates to rotate the lead nut wherein motor is controlled by a servo system comprising an encoder operatively connected to said motor, a servo controller operatively connected to said encoder for processing encoder signals, an amplifier operatively connected to said servo controller, with said amplifier operatively connected to said motor to drive said motor; and
f. wherein the lead nut is covered by a cover system comprising a first surface, a second surface positioned relative to said first surface such that there is a covered opening between the two surfaces, a bridge structure with one side at least as long as the covered opening is wide, a bridge support structure, which is movable along the covered opening, which supports the bridge structure in a position over and across the covered opening, and a band which is mounted over the covered opening such that it covers at least part of the covered opening and is also mounted over the bridge structure such that the band is lifted from the covered opening as the bridge support structure is moved along the band.

68. The linear drive system and cover system of claim 67 wherein said bridge supporting structure is a structure comprising a hood apparatus having an inside and an outside with a hole therein sufficiently large for accepting the width of the band, with said hood apparatus being mounted over the covered opening with the hole positioned toward the covered opening and such that the bridge structure is disposed within the inside of said hood apparatus.

69. The linear drive system and cover system of claim 68, wherein the amplifier is disposed within the hood apparatus.

70. The linear drive system and cover system of claim 69, wherein the servo controller is also disposed within the hood apparatus.

* * * * *